US012793952B2

(12) United States Patent
Beric et al.

(10) Patent No.: US 12,793,952 B2
(45) Date of Patent: Nov. 10, 2026

(54) MICRO-CHANNEL PLATE MOUNT ASSEMBLY FOR ION DETECTOR IN MASS SPECTROMETRY

(71) Applicant: DH Technologies Development Pte. Ltd., Singapore (SG)

(72) Inventors: Nikola Beric, Etobicoke (CA); Graham A. Leith, Concord (CA); Robert Nieckarz, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 305 days.

(21) Appl. No.: 18/698,956

(22) PCT Filed: Oct. 5, 2022

(86) PCT No.: PCT/IB2022/059523
§ 371 (c)(1),
(2) Date: Apr. 5, 2024

(87) PCT Pub. No.: WO2023/057933
PCT Pub. Date: Apr. 13, 2023

(65) Prior Publication Data

US 2025/0218755 A1 Jul. 3, 2025

Related U.S. Application Data

(60) Provisional application No. 63/252,962, filed on Oct. 6, 2021.

(51) Int. Cl.
*H01J 49/02* (2006.01)

(52) U.S. Cl.
CPC .................................. *H01J 49/025* (2013.01)

(58) Field of Classification Search
CPC .......... H01J 49/00; H01J 49/02; H01J 49/025; H01J 43/246; H01J 43/28
(Continued)

(56) References Cited

U.S. PATENT DOCUMENTS 5,510,673 A * 4/1996 Wodecki ................. H01J 43/28 250/214 VT
6,483,231 B1 * 11/2002 Iosue .................... H01J 43/246 313/530

(Continued)

FOREIGN PATENT DOCUMENTS

GB 1302152 A 1/1973
JP 2016207561 A 12/2016
WO 9529503 A1 11/1995

OTHER PUBLICATIONS

International Search Report and Written Opinion, PCT/IB2022/059523, dated Jan. 16, 2023, 34 pages.

*Primary Examiner* — Jason L Mccormack
(74) *Attorney, Agent, or Firm* — Potomac Law Group, PLLC; Reza Mollaaghababa; Brian J. Hairston

(57) ABSTRACT

A mount assembly for holding a microchannel plate in an ion detector includes an input side clamping plate including a plurality of input side pads; and an output side clamping plate including a plurality of output side pads, wherein, when assembled, the input side clamping plate and the output side clamping plate are configured to allow positioning between the input side clamping plate and the output side clamping plate the microchannel plate having a plurality of microchannels each having an input side opening and an opposed output side opening; hold the microchannel plate; and position the subset of the input side pads and the subset of the output side pads in a staggered configuration such that when a microchannel of a plurality of microchannels is obstructed in a first opening, a second opening of the microchannel opposing the first opening is unobstructed.

16 Claims, 13 Drawing Sheets

(58) Field of Classification Search
USPC .......................................... 250/281, 282, 288
See application file for complete search history.

(56) References Cited

U.S. PATENT DOCUMENTS

| | | | | |
|---|---|---|---|---|
| 2007/0236118 | A1 | 10/2007 | Laprade et al. | |
| 2010/0102213 | A1 | 4/2010 | Garris | |
| 2010/0225221 | A1* | 9/2010 | Suzuki .................. | H01J 43/246 313/104 |
| 2017/0047213 | A1* | 2/2017 | Hayashi ................ | H01J 43/246 |

* cited by examiner

MICRO-CHANNEL PLATE MOUNT ASSEMBLY FOR ION DETECTOR IN MASS SPECTROMETRY

RELATED APPLICATIONS

This application is a 35 U.S.C. § 371 national stage filing of International Application No. PCT/IB2022/059523, filed on Oct. 5, 2022, which claims priority to U.S. Provisional Application No. 63/252,962 filed on Oct. 6, 2021, the contents of both of which are incorporated herein in their entireties.

TECHNICAL FIELD

The present disclosure relates generally to ion detectors and more specifically ion detectors used in mass spectrometry.

BACKGROUND

A micro-channel plate (MCP) is a planar component used for detection of particles (including electrons, ions, and neutrons, hereinafter generally called ions for brevity), e.g., in a mass spectrometry (MS) device. An MCP may be installed in a mass spectrometer by being inserted into an assembly that holds the MCP in place and in the path of the ions. The MCP and its functionality may be sensitive to changes in configuration or deformations.

SUMMARY

In some embodiments, the techniques described herein relate to a mount assembly for holding a microchannel plate in an ion detector, the mount assembly including: an input side clamping plate including a plurality of input side pads and defining an input side aperture; and an output side clamping plate including a plurality of output side pads, wherein, when assembled, the input side clamping plate and the output side clamping plate are configured to: allow positioning between the input side clamping plate and the output side clamping plate the microchannel plate having a plurality of microchannels each having an input side opening and an opposed output side opening; define at least an exposed area and a covered area on the microchannel plate, the exposed area being circumscribed by the input side aperture, and the covered area being outside the exposed area and having an input side face facing the input side clamping plate and an output side face facing the output side clamping plate; allow a plurality of ions to pass through the input side aperture and reach a subset of the microchannels located in the exposed area of the microchannel plate; hold the microchannel plate by providing contact between a portion of the input side face of the covered area and a subset of the input side pads, and further between a portion of the output side face of the covered area and a subset of the output side pads; and position the subset of the input side pads and the subset of the output side pads in a staggered configuration such that when a microchannel of a plurality of microchannels located in the covered area is obstructed in a first opening, the first opening being an input side opening of the microchannel obstructed by an input side pad of the subset of the input side pads or an output side opening of the microchannel obstructed by an output side pad of the subset of the output side pads, a second opening of the microchannel opposing the first opening is unobstructed.

In some embodiments, the techniques described herein relate to a mount assembly, wherein, when assembled and holding the microchannel plate, the input side clamping plate and the output side clamping plate are further configured to maintain or increase flatness of the microchannel plate.

In some embodiments, the techniques described herein relate to a mount assembly, further including a supporting plate configured for mechanical engagement with the output side clamping plate.

In some embodiments, the techniques described herein relate to a mount assembly, further including a biasing element configured for: being positioned between the supporting plate and the output side clamping plate; and allowing the output side clamping plate to float with respect to the input side clamping plate.

In some embodiments, the techniques described herein relate to a mount assembly, wherein the biasing element is a spring.

In some embodiments, the techniques described herein relate to a mount assembly, further including two openings disposed in the input side clamping plate and the output side clamping plate configured for receiving a fastener for mechanically engaging the supporting plate to the input side clamping plate.

In some embodiments, the techniques described herein relate to a mount assembly, further including a plurality of pins protruding from the input side clamping plate and configured to: engage with corresponding openings in the output side clamping plate; and align the input side clamping plate with the output side clamping plate.

In some embodiments, the techniques described herein relate to a mount assembly, wherein the plurality of pins are further configured to define a location of the microchannel plate between the input side clamping plate and the output side clamping plate.

In some embodiments, the techniques described herein relate to a mount assembly, wherein the staggered configuration provides, for the microchannel of the plurality of microchannels located in the covered area, an exhaust through the second opening.

In some embodiments, the techniques described herein relate to a mount assembly, further including electrical connections configured to create an electrical potential difference between the input side clamping plate and the output side clamping plate.

In some embodiments, the techniques described herein relate to a mount assembly, wherein in the staggered configuration a distance between a first input side pad in contact with the input side face of the covered area and a second output side pad in contact with the output side face of the covered area is greater than a threshold distance to avoid subjecting the microchannel plate to high stress resulting from scissors effect.

In some embodiments, the techniques described herein relate to a mount assembly, wherein the output side clamping plate further defines an output side aperture, In some embodiments, the techniques described herein relate to a mount assembly, further including a supporting plate configured for mechanical engagement with the input side clamping plate.

In some embodiments, the techniques described herein relate to a mount assembly, further including a biasing element configured for: being positioned between the supporting plate and the input side clamping plate; and allowing the input side clamping plate to float with respect to the output side clamping plate.

In some embodiments, the techniques described herein relate to a mount assembly for holding a microchannel plate in an ion detector, the mount assembly including: an input side clamping plate including a plurality of input side pads and defining an input side aperture; and an output side clamping plate including a plurality of output side pads and separated from the input side clamping plate to provide a gap in which the microchannel plate is positioned, wherein the microchannel plate includes a plurality of microchannels each having two opposed openings, wherein the input side and output side clamping plates are positioned relative to one another such that a first subset of the microchannels can receive ions via the input side aperture and a second subset of the microchannels are inaccessible to the ions passing through the input side aperture, and wherein at least a portion of the input side pads are distributed relative to at least a portion of the output side pads in a staggered configuration such that when an opening of an ion-inaccessible microchannel is obstructed by one of the input or output pads, an opposed opening the ion-inaccessible microchannel remains unobstructed.

In some embodiments, the techniques described herein relate to a mount assembly, further including a plurality of contacts positioned between said input side clamping plate and the output side clamping plate for fixedly holding said input side and said output side clamping plates relative to one another.

In some embodiments, the techniques described herein relate to a mount assembly for holding a microchannel plate in an ion detector, the mount assembly including: an input side clamping plate including a plurality of input side pads and defining an input side aperture; and an output side clamping plate including a plurality of output side pads, wherein, when assembled, the input side clamping plate and the output side clamping plate are configured to: allow positioning between the input side clamping plate and the output side clamping plate the microchannel plate; and maintain or improve a flatness of the microchannel plate.

In some embodiments, the techniques described herein relate to a mount assembly, wherein: the plurality of input side pads include a plurality of peripheral input side pads positioned in a periphery of the input side clamping plate; the plurality of output side pads include a plurality of peripheral outside pads positioned in a periphery of the output side clamping plate; and the plurality of peripheral input side pads and the plurality of peripheral output side pads are configured to maintain or improve flatness in a periphery of the microchannel plate.

In some embodiments, the techniques described herein relate to a mount assembly, wherein: the plurality of input side pads further include a plurality of internal input side pads positioned in an internal area of the input side clamping plate; the plurality of output side pads include a plurality of internal outside pads positioned in an internal area of the output side clamping plate; and a combination of the plurality of peripheral input side pads, the plurality of internal input side pads, the plurality of peripheral output side pads, and the plurality of internal output side pads are configured to maintain or improve flatness in an internal area of the microchannel plate.

In some embodiments, the techniques described herein relate to a mount assembly for holding a plurality of microchannel plates in an ion detector, the mount assembly including: an input side clamping plate including a plurality of input side pads and defining an input side aperture; and an output side clamping plate including a plurality of output side pads, wherein, when assembled, the input side clamping plate and the output side clamping plate are configured to: allow positioning between the input side clamping plate and the output side clamping plate the plurality of microchannel plates; and maintain or improve flatness of one or more microchannel plates of the plurality of microchannel plates.

Further understanding of various aspects of the embodiments may be obtained by reference to the following detailed description in conjunction with the associated drawings, which are described briefly below.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

It will be appreciated that for clarity, the following discussion will explicate various aspects of embodiments of the present disclosure, while omitting certain specific details wherever convenient or appropriate to do so. For example, discussion of like or analogous features in alternative embodiments may be somewhat abbreviated. Well-known ideas or concepts may also for brevity not be discussed in an any great detail. One of ordinary skill will recognize that some embodiments of the present disclosure may not require certain aspects of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

Some embodiments provide systems or mechanisms for holding one or more MCPs in a mass spectrometer. More specifically, in some embodiments, one or more MCPs are inserted in an MCP holder that holds the one or more MCPs in place and forms a microchannel plate assembly (hereinafter alternatively called MCP assembly or assembly for brevity). The MCP assembly is then included in an MCP detector, which is positioned inside the mass spectrometer to detect the emitted ions as further described below.

In some embodiments, the MCP holder is designed to maintain or improve the functionality of the MCP by, for example, maintaining or improving the flatness of the MCP, as further described below. Moreover, some embodiments provide mechanisms that reduce different types of stresses that may be exerted on the MCP or reduce erosions that may result from electric discharge, as also further described below.

Figure 1A:
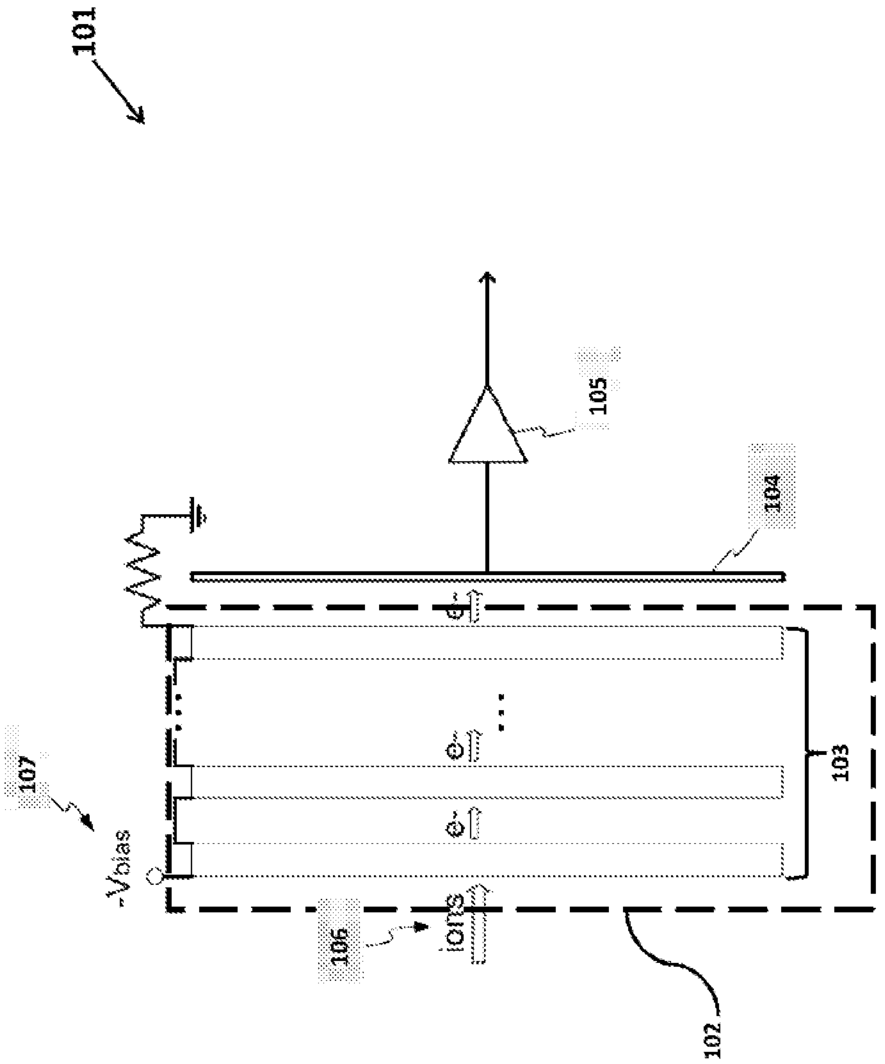
FIG. 1A shows a diagram of an MCP detector 101 according to some embodiments.

FIG. 1A shows a diagram of an MCP detector 101 according to some embodiments. MCP detector 101 includes an MCP assembly 102, which in turn includes one or more MCPs 103. The structure of the MCP assembly and the MCP is further described in detail below. MCP detector 101 further includes an anode 104, and an amplifier 105. A bias voltage 107 is applied from the front of one or more plates 103 to the back of one or more plates 103. A negative bias voltage 107 attracts, for example, positive ions 106 to the front of one or more microchannel plates 103. Ions 106 enter the angled microchannels of the first plate of one or more plates 103 and impact the walls of the angled microchannels causing a cascade of electrons to be emitted from the back of the first plate. Electrons emitted from each preceding plate impact the following plate multiplying again the number of electrons produced.

Finally, the back of the last plate of one or more plates 103 emits electrons that are received by anode 104, which collects the measured electrical signal of the electrons. The measured electrical signal may be amplified using amplifier 105, for example, or any transducer capable of propagating the electrically-encoded arrival time and intensity information of the ion. The electrical signal can be used to deduce different characteristics of the incoming ions, such as their spectrum intensity and time of arrival.

Figure 1B:
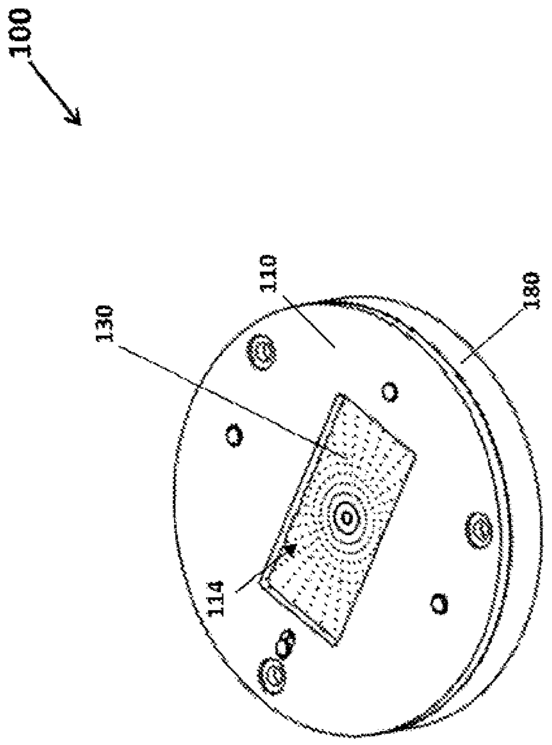
FIG. 1B shows an isometric view of a microchannel plate assembly 100 in its assembled configuration according to some embodiments.
Figures 2A, 2B:
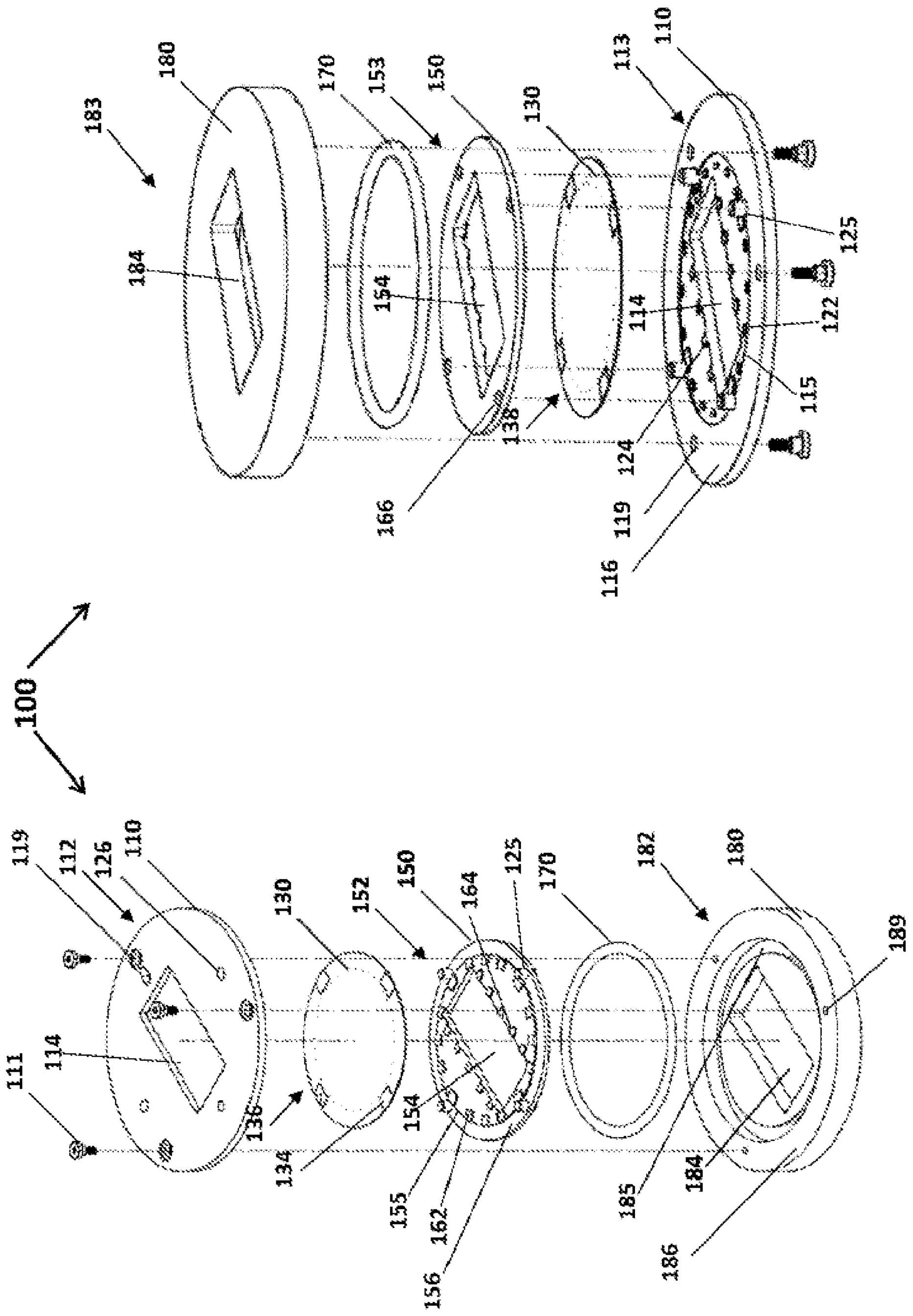
FIGS. 2A and 2B show two isometric exploded views of assembly 100 according to some embodiments.
Figure 3:
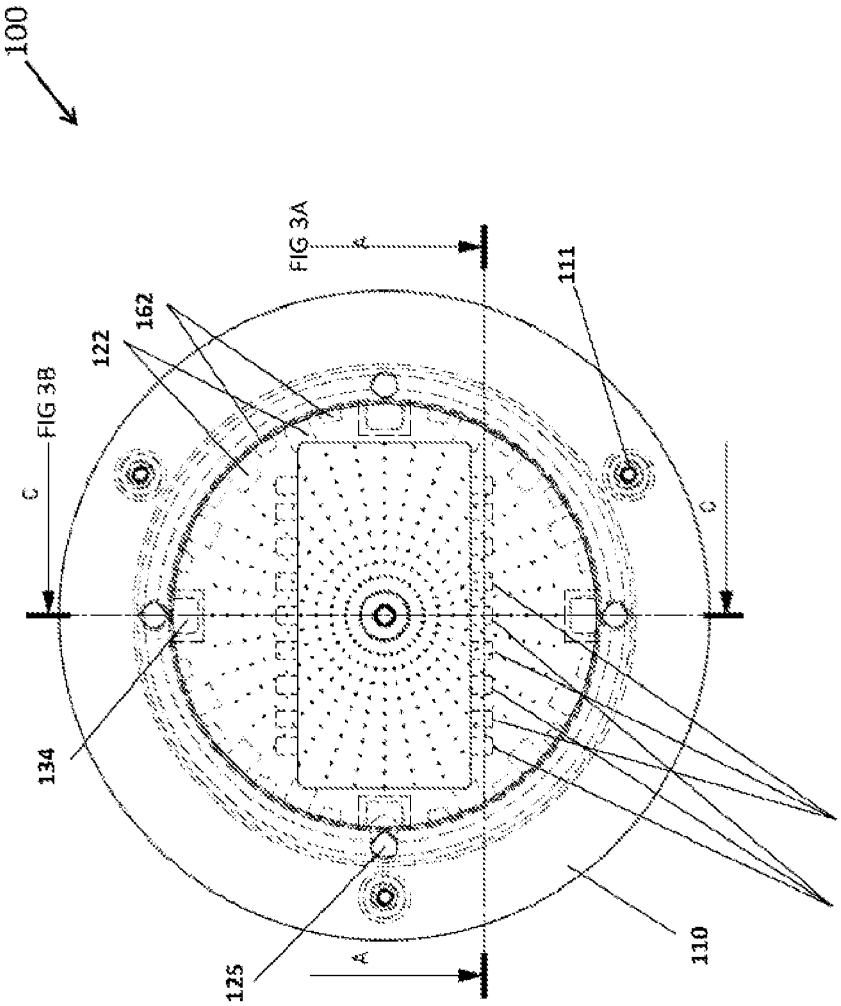
FIG. 3 shows a front view of assembly 100 according to some embodiments.
Figure 3A:
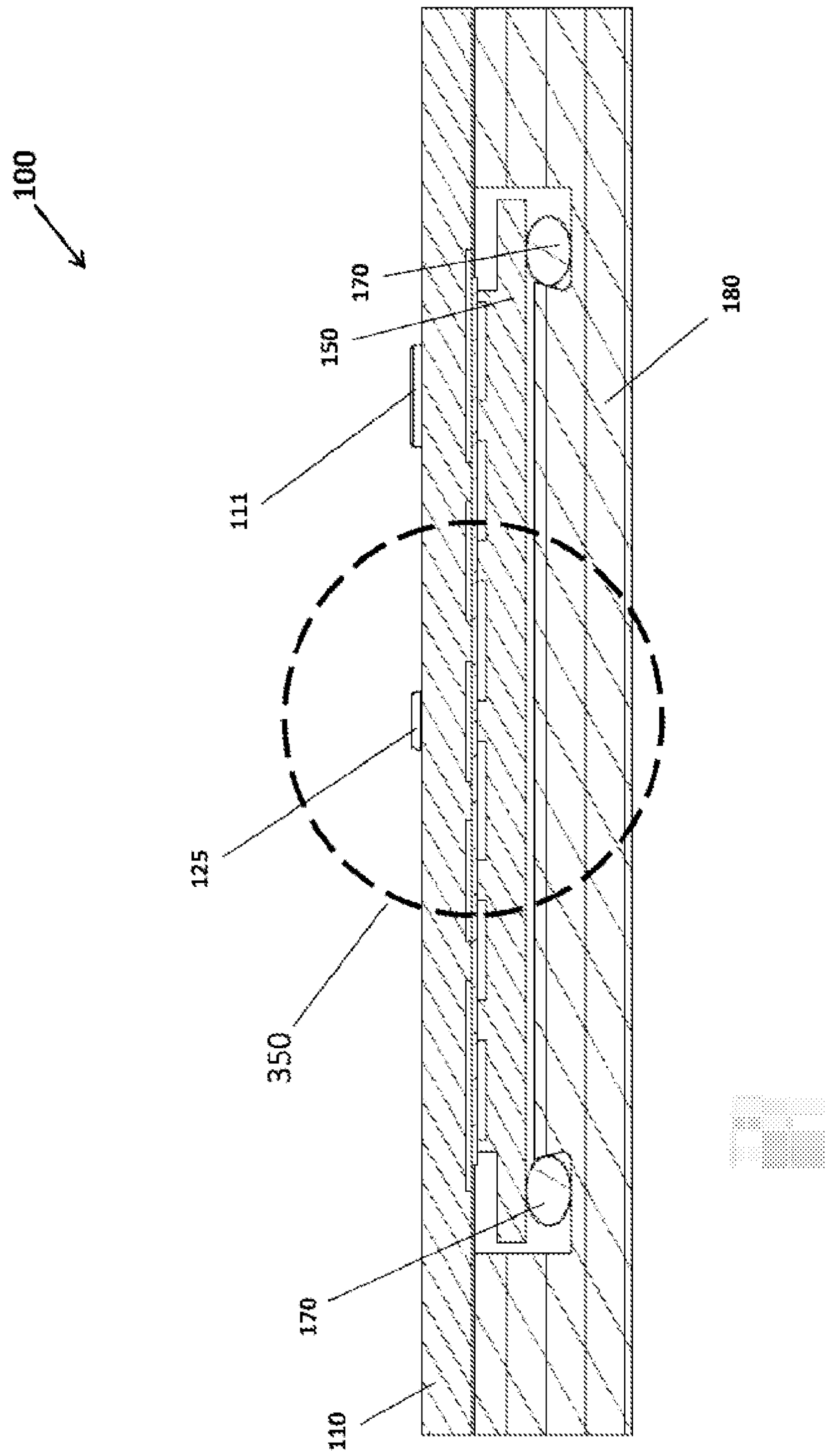
FIGS. 3A and 3B show two different sectional views of assembly 100 as marked in FIG. 3.
Figure 3B:
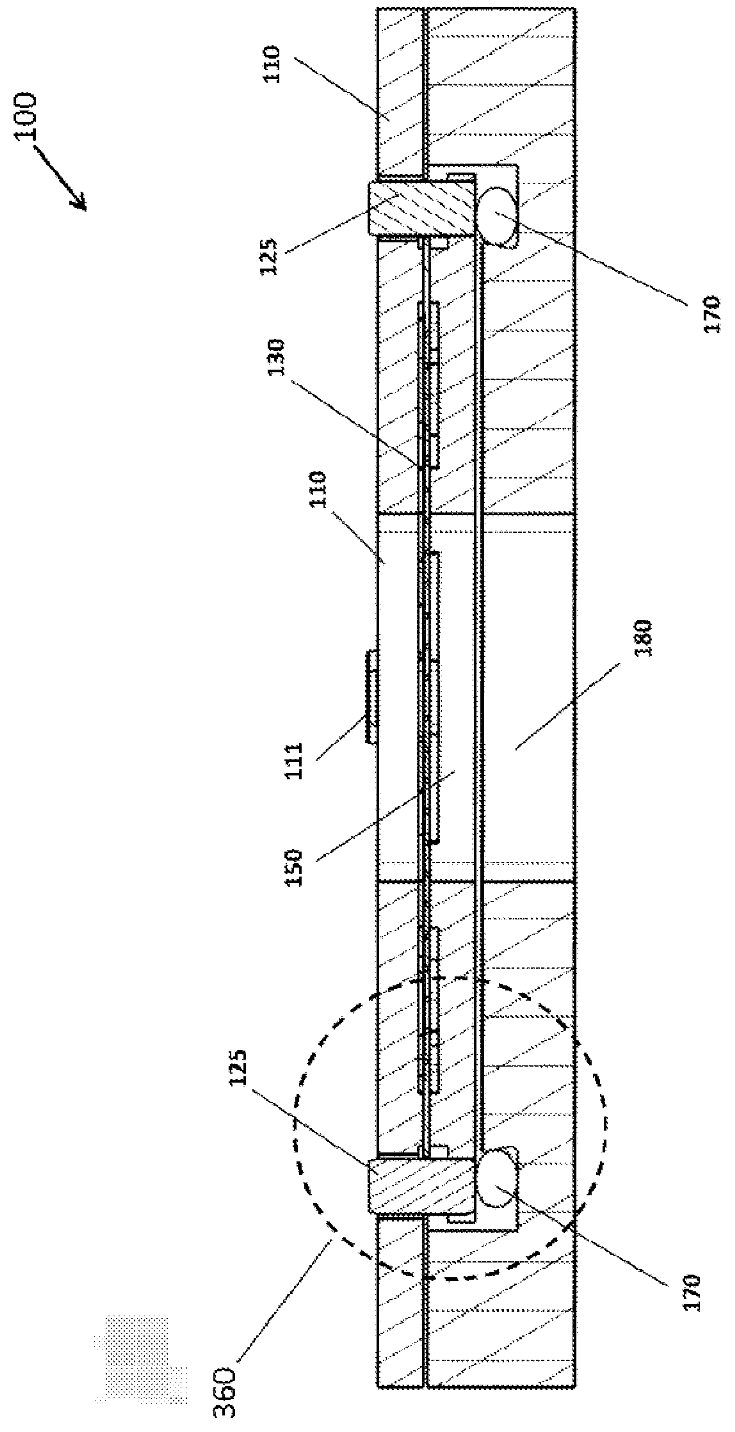

Next, the structure of an MCP assembly 100 is discussed with reference to FIGS. 1B-3E, each of which may show the structure of the MCP assembly in one aspect or from a point of view. More specifically, as further described below in detail, FIG. 1B shows an isometric view of MCP assembly 100 according to some embodiments. FIGS. 2A and 2B show two isometric exploded views of assembly 100 according to some embodiments. FIG. 3 shows a front view of assembly 100 according to some embodiments, while FIGS. 3A and 3B show two different sectional views of assembly 100 marked in FIG. 3 as cross sections A-A and C-C respectively, and FIGS. 3C and 3D respectively show detailed views 350 and 360 marked in FIGS. 3A and 3B. FIG. 3E shows a configuration of clamping elements according to some embodiments.

As shown in these figures, assembly 100 includes an input plate 110 (alternatively called input side clamping plate), an MCP 130, an output plate 150 (alternatively called output side clamping plate), a biasing element (e.g., a spring 170), and a supporting plate 180. Assembly 100 further includes three screws 111, which, when assembly 100 is assembled (as in FIG. 1A), attach input plate 110 to supporting plate 180 so as to hold between them the MCP, the output plate, and the spring, in the order shown in FIGS. 2A and 2B. While in the embodiments shown here, the MCP holder is configured to hold one MCP, in some embodiments the MCP holder may be configured to hold two or more MCPs. In some of such embodiments the multiple MCPs may be stacked on top of each other and separated by spacers such as one or more rings, annular shims, tabs, or annular shims with inward projecting tabs. A first MCP may be in contact with the input holder on one of its faces and with a second MCP on the opposite face; and, similarly, a last MCP may be in contact with the output plate on one of its faces and with the previous MCP on the opposite face.

In assembly 100, MCP 130 may detect arrival of ions in the manner detailed below. The other parts of assembly 100 are collectively called the MCP holder assembly (alternatively called the MCP holder). The MCP holder may be configured to hold the MCP in place and possibly improve its detection reproducibility as further described below.

In the embodiments shown in the above listed, the parts of the assembly may be joined in the order shown in FIG. 2A to form assembly 100 as shown in FIG. 1B. More specifically, in some embodiments, assembly 100 may be set up as follows. First, supporting plate 180 is laid down in the manner shown in FIG. 2A. Then, output plate 150 is positioned on top of the supporting plate with spring 170 positioned between them. Then, MCP 130 is laid in its position on top of the output plate and input plate 110 is laid on top of the MCP, such that the input plate and the output plate sandwich the MCP between them. Then the screws are used to fasten input plate 110 to supporting plate 180. In other embodiments, the assembly may be set up in other ways or the parts may be laid in other orders.

Next describing different parts of the MCP holder, starting with input plate 110, which in this embodiment is a disc-shaped end plate that may be made of a conducting material, e.g., a metal such as stainless steel, Invar, titanium, aluminum. Input plate 110 is positioned at one end of the assembly and has an external face 112 having an opening, a window 114, that is exposed to the incoming ions, and further has an internal face 113 that faces the MCP and may come into contact with the MCP.

In the embodiment shown as assembly 100, input window 114 is a rectangularly shaped opening or hole formed in the middle of input plate 110. In other embodiments, the input window may be an opening of other shapes, such as circular, square shaped, oval, etc.

Internal face 113 of input plate 110 includes an input plate MCP area 115 (alternatively called the MCP area of the input plate) and an input plate rim area 116 (alternatively called the rim of the input plate), which surrounds its MCP area. The MCP area is an area of the internal face that, in the assembly, covers one side of the MCP (called input side face or input face 136 of the MCP). For example, the MCP area of the input plate corresponds to an area of the input plate that can be obtained via a putative projection of the MCP on the input plate. The MCP area may have the same shape and dimensions as the MCP. In assembly 100, for example, MCP area 115 is in the shape of a circle with a diameter approximately equal to the diameter of the MCP. In some embodiments, the diameter of MCP area 115 may be larger than the diameter of the MCP, because MCP area 115 includes pins 125, which in turn fit the MCP among them. More specifically, in some embodiments, pins 125 are positioned such that they are located at or near the edge of MCP, when the MCP assembly is assembled. With this configuration, pins 125 may maintain the MCP centered or approximately centered with respect to the input plate and prevent it from sliding with respect to the input plate during the operation of the ion detector.

The MCP area of the input plate also includes the input window 114 and further includes input plate clamping elements (alternatively called input clamps) in the shape of peripheral input plate pads 122 (alternatively called peripheral input pads) and internal input plate pads 124 (alternatively called internal input pads) further described below. In different embodiments, as described later, the input clamps may take forms other than pads, such as circular rings, rectangular rings, elongated pads, etc.

In the MCP assembly, some or all of the input plate clamping elements may come into contact with the MCP input face. These contacts may perform one or both of two different functions. A subset of the contacts may exert pressure on the input face to maintain or improve the flatness of the MCP, as further discussed below. Moreover, a subset of the input plate clamping elements (and in some embodiments all of them) may be electrically conductive. By coming into contact with the MCP input face, these conductive clamping elements may provide electrical connections between the input plate and the MCP input face, causing that face to be at the same electrical potential as the input plate.

Assembly 100 further includes four pins 125 for positioning the plates as further described below. Moreover, input plate 110 also includes three screw-holes 119 for receiving screws 111 and four pin holes 126 for receiving pins 125.

Continuing with describing different parts of the MCP holder in assembly 100, in this embodiment output plate 150 is also a disk-shaped plate that may be made of a conducting material, e.g., a metal such as stainless steel, Invar, titanium, aluminum. Output plate 150 has an internal face 152 that faces and may come into contact with MCP 130, and also has an external face facing supporting plate 180. Internal face 152 of output plate 150 includes an output plate MCP area 155 (alternatively called the MCP area of the output plate) and an output plate rim area 156 (alternatively called the rim of the output plate), which surrounds its MCP area.

The MCP area of the output plate is an area of the internal face that, in the assembly, covers the output face 138 of the MCP, which itself is the side of the MCP that is opposite to its input face 136. The MCP area of the output plate may have the same shape and dimensions as the MCP. In assembly 100, for example, MCP area 155 is in the shape of a circle with a diameter equal or approximately equal to the diameter of the MCP. In some embodiments, the diameter of MCP area 155 may be larger than the diameter of the MCP for reasons similar to those described above for MCP area 115.

Output plate 150 includes an opening called an output window 154 (also called the output window of the output plate). In assembly 100, output window 154 is located in the MCP area 155 and has the same rectangular shape and dimensions as that of the input window 114. Moreover, when positioned in the assembly, the output window and the input window overlap each other, that is, are in substantial alignment with each other. In some embodiments, the output window may have other shapes and dimensions, and may be different from the input window.

Output plate 150 further includes four pin holes 166 for receiving pins 125. In various embodiments, pins 125 may be affixed to input plate 110 and fit pin holes 166, or alternatively affixed to output plate 150 and fit into pin holes positioned in the input plate, or may be separate from, and configured to be inserted into pin holes drilled on, the input plate and the output plate. In different embodiments, the pins may perform different functions, such as causing the input plate and the ultimate plate to be positioned in predetermined orientations with respect to each other, as required for the positioning of the pads further discussed below. Moreover, the pins may prevent the MCP from slipping away from its location in the middle of the input plate and the output plate. In some embodiments, pins 125 may be made of electrically insulating material to avoid creating electrical connection between the input plate and the output plate which may be maintained at different electrical potentials.

MCP area 155 of the output plate further includes output plate clamping elements (alternatively called output clamps) in the shape of peripheral output plate pads 162 (alternatively called peripheral output pads) and internal output plate pads 164 (alternatively called internal output pads) further described below. In different embodiments, as also described later, the output clamps may take forms other than pads, such as circular rings, rectangular rings, elongated pads, etc.

In the MCP assembly, some or all of the output plate clamping elements may come into contact with the MCP output face. These contacts may perform one or both of two different functions. A subset of the contacts may exert pressure on the output face to maintain or improve the flatness of the MCP, as further discussed below. Moreover, a subset of the output plate clamping elements (and in some embodiments all of them) may be electrically conductive. By coming into contact with the MCP output face, these conductive clamping elements may provide electrical connections between the output plate and the MCP output face, causing that face to be at the same electrical potential as the output plate. Therefore, the input face and the output face of the MCP may be maintained at different electrical potentials, creating an electric field inside the microchannels, which may drive the electrons in a predetermined directions as further discussed below.

Continuing with describing different parts of the MCP holder in MCP assembly 100, in this embodiment supporting plate 180 is also a circular plate that may be made of insulating material such as plastic or ceramics. Supporting plate 180 has an internal face 182 that faces output plate 150, and also has an external face 183 which faces outside the assembly. Supporting plate 180 includes an opening called an output window 184 of the supporting plate, which is visible from internal face 182 and external face 183. Internal face 182 of the supporting plate further includes spring housing 185, a rim 186, and three screw-holes 189.

A biasing element 170, in the form of a canted coil spring in this embodiment, is configured to be located inside spring housing 185 of the supporting plate between the supporting plate and the perimeter of the output plate. Biasing element 170 may be of different shapes and structures such as a canted coil spring (as in assembly 100), spring spacer, leaf spring, compression spring, wave spring, or any material with a displacement-dependent returning force. Further, spring 170 may be made of Stainless Steel, Beryllium Copper, Nickel or Gold plated.

Continuing with describing different parts of assembly 100, next MCP 130 is described. The MCP may be a perforated disc that detects ions that reach its surface through the microchannels according to some embodiments. In some embodiments, the MCP may be made of perforated solid glass with a resistive surface that has a low work function. The faces of the MCP may be coated with a conducting material, for example nichrome alloy, to facilitate electrical contact to the microchannels.

Figure 4A:
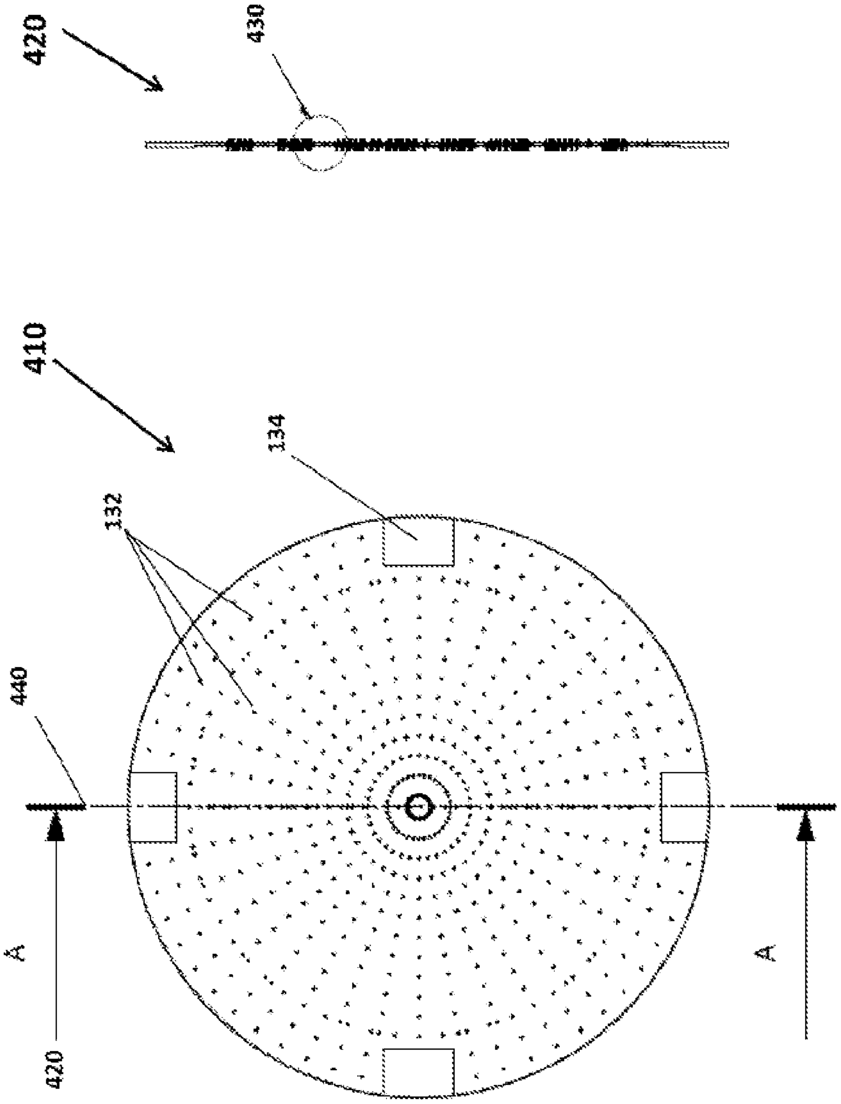
FIG. 4A shows a front view 410 and a side view 420 of an MCP 130 according to some embodiments.
Figure 4B:
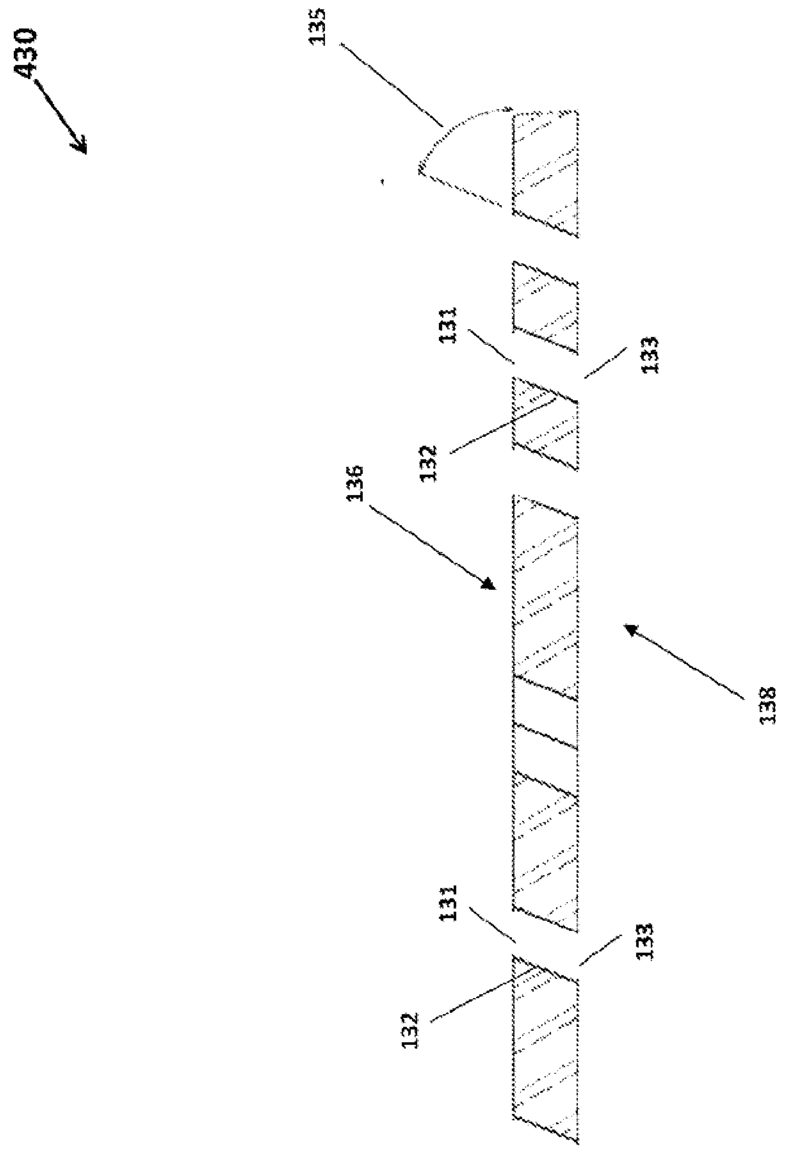
FIG. 4B shows a cross section 430 of MCP 130 according to some embodiments.

FIG. 4A shows a front view 410 and a side view 420 of MCP 130, and FIG. 4B shows a cross section 430 of MCP 130 according to some embodiments. In this embodiment, MCP 130 is in the form of a disc with a diameter in the range of 18 mm to 50 mm.

MCP 130 includes a large number of microchannels 132 and four solid mounting pads 134 (each alternatively called an MCP pad). In some embodiments, the number of microchannels in the MCP may be between 1 million and 6 million, may be spaced about 6 um center to center.

As depicted in FIG. 4B, each microchannel 132 is defined in the MCP as a hollow cylinder crossing the thickness of the MCP at an angle 135. Noteworthy is that the relative sizes in FIGS. 4A and 4B may have been exaggerated for demonstration and may not correspond to the actual relative sizes in different embodiments. For example, while the thickness of the MCP may be in the range 0.3 mm-0.5 mm, the diameter of a microchannel may be 4-10 um. Moreover, in various embodiments, angle 135 may be different from 90 degrees, and may be in the range 10-15 degrees from normal.

As mentioned earlier, the two faces of MCP 130 are the MCP input side face (alternatively called input face for brevity) and the opposing MCP output face (also alternatively called output face for brevity). Input face 136 is identified as the surface of MCP that faces the input plate when the MCP is placed in the holder assembly and is configured to receive ions. Similarly, output face 138 is defined as the surface of the MCP that faces the output plate when the MCP is placed in the holder assembly. In some embodiments, these two surfaces are interchangeable, meaning that the MCP is symmetric with respect to a 180-degree rotation around a diameter such as diameter 440. Alternatively, and in some embodiments, the two surfaces are not interchangeable and are differentiated by different depth of metallization into the microchannel. In such cases, one or both of the two surfaces may be marked to be inserted in the MCP holder such that the surface designated as the input face touches the input plate.

Each microchannel 132 includes two openings at its two ends. One of the two openings is an input side opening 131 (also called the microchannel's entrance for brevity) that is located on input face 136. The other opening is an output side opening 133 (also called the microchannels exit for brevity) that is located on output face 138.

When detecting an ion, a microchannel 132 may act as a multiplier cavity. More specifically, an ion may enter the microchannel through its entrance 131 and may hit the wall of the microchannel. In some embodiments, different ions reaching the microchannel may have a kinetic energy between 6 keV (kilo electron volts) and 15 keV. Due to the kinetic energy of the ion, the collision may cause one or more electrons to be released from the surface of the microchannel. Those electrons may in turn collide with the wall of the microchannel and cause release of secondary electrons, and so on. The electric field present in the microchannel may drive the electrons towards the output face of the MCP. Eventually, the electrons released on the output face of the MCP may indicate the arrival of the ion that initiated the release.

In some embodiments, a subset of the microchannels may be active microchannels while another subset of microchannels may be inactive microchannels. More specifically, an active microchannel may be a microchannel that is exposed to the arrival of the ions and further the electrons released from that microchannel can reach the electron collector. Therefore, in some embodiments, an active microchannel may be a subset of microchannels that are located in an area of the MCP that is in substantial alignment with the input window and the output window. In some embodiments, the area of the MCP that includes active microchannels is called an active area of the MCP. In various embodiments, the active area of the MCP may be inside the area that is defined by the overlap of the input window and the output window. In embodiments in which these two windows completely overlap, that overlap area includes the active area of the MCP. In embodiments in which the two windows do not overlap, the active area of the MCP is inside the intersection area of the two windows. Then inactive area of the MCP includes portions that are not located in the active area. Microchannels that are located in the inactive area of the MCP are considered inactive microchannels, and do not participate in detection of ions. In some embodiments, for example, the active microchannels are located near the center of the MCP.

Various embodiments of the MCP holder assembly provide features that improve the functionality of the assembly or the MCP in one or more aspects. Those aspects include, for example, maintaining or increasing the flatness of the MCP, reducing erosion of the MCP assembly due to electric discharge, or increasing tolerance of the MCP assembly against temperature changes or external stress. Those features are described below in detail.

Some embodiments provide features for maintaining or increasing the flatness of the MCP. Increasing the flatness of the MCP may increase the timing accuracy of the ion detector. More specifically, although the MCP may be designed to be flat, it may not be completely flat due to manufacturing limitations or because it may be deformed when installed in the assembly. In an MCP that is not flat, microchannels originating in different parts of its input face would be at different distances with respect to the input window. Therefore, ions that arrive at the same time with respect to the input window, may enter different microchannels at different times. Therefore, for two identical ions that may have reached the input window at the same time and with the same kinetic energy, the resulting released electrons may reach the electron collector at different times, therefore registering different times of arrival for those two ions. Because of these effects, deviations from a fully flat MCP may result in inaccuracies in measuring the ion mass spectrum.

Various embodiments maintain or increase the flatness of the MCP in the MCP holder assembly by providing two or more points of support on the input face and/or two or more points of support on the output face of the MCP. The two or more points of support on each face of the MCP may be provided by one or more clamping elements on the input plate and one or more clamping elements on the output plate. The clamping elements may be in one or more shapes such as pads, rings, elongated pads, etc., as described earlier.

In the embodiment shown as assembly 100, the input plate includes a first set of clamping elements in the form of peripheral input pads 122 and a second set of clamping elements in the form of internal input pads 124. The peripheral input pads are located at or in the proximity of the outer periphery of input plate MCP area 115. The internal input pads, on the other hand, are located closer to the center of the input plate MCP area, in this case around input window 114. In general, the input plate may include two or more peripheral clamping elements and one or more internal clamping elements, such that, compared to the peripheral clamping elements, the internal clamping elements are located closer to the center of the input plate MCP area. The locations of the clamping elements with respect to each other are selected such that, as further described below, they help maintain or improve the flatness of the MCP in the direction of its output face when the MCP is assembled in assembly 100. As used here, terms peripheral and internal relative terms, indicating that internal parts are generally closer to the center of the MCP as compared to the peripheral parts.

Similarly, in assembly 100, the output plate includes a first set of clamping elements in the form of peripheral output pads 162 and a second set of clamping elements in the form of internal output pads 164. The peripheral output pads are located at or in the proximity of the outer periphery of output plate MCP area 155. The internal output pads, on the other hand, are located closer to the center of the output plate MCP area, in this case around output window 154. In general, the output plate may include two or more peripheral clamping elements and one or more internal clamping elements, such that, compared to the peripheral clamping elements, the internal clamping elements are located closer to the center of the output plate MCP area. The locations of the clamping elements with respect to each other are selected such that, as further described below, they help maintain or improve the flatness of the MCP in the direction of its input face, when the MCP is assembled in assembly 100.

In various embodiments, deviation of an MCP from being flat (alternatively called deviation from flatness) may be measured quantitatively as the distance between the closest pair of parallel planes between which the MCP can be fully embedded. Consequently, maintaining or improving flatness of a surface may be defined as maintaining or decreasing the value of the deviation from flatness.

In some embodiments, the peripheral clamping elements of the input plate and of the output plate may maintain or improve flatness of the MCP at its periphery. More specifically, when the MCP is sandwiched between the input plate and the output plate, the peripheral clamping elements on these two plates may exert pressure on some points of the MCP periphery for which the deviation from flatness exceeds a maximum tolerance for the deviation from flatness. Similarly, while the MCP is installed in the MCP holder, the peripheral clamping elements on the two plates may prevent the MCP periphery from deviating from flatness more than the maximum tolerance for the deviation from flatness. The maximum tolerance for deviation from flatness may be defined by the location of the pads and their heights on each of the two plates. For example, the maximum tolerance for deviation from flatness may be defined as the maximum deviation from flatness that a surface can have while being confined between a first surface defined by the tips of the input plate pads and a second surface defined by the tips of the output plate pads.

Further, in some embodiments, the combination of the peripheral clamping elements and the internal clamping elements of the input plate and of the output plate maintain or improve flatness of the MCP. More specifically, when the MCP is sandwiched between the input plate and the output plate the combination of the peripheral and internal clamping elements of these two plates may exert pressure on some internal points of the MCP for which the deviation from flatness exceeds a maximum deviation tolerance. Similarly, while the MCP is installed in the MCP holder, the combination of the peripheral and internal clamping elements of the two plates may prevent the internal points of the MCP from deviating in their flatness from a maximum deviation tolerance. In some embodiments, the maximum deviation may be between 5 and 40 micrometers. In some other embodiments, the maximum deviation may be between 5 and 20 micrometers. In yet some other embodiments, the maximum deviation tolerance may be between 5 and 10 micrometers.

More specifically, in some embodiments, maintaining or increasing the flatness in the internal points of the MCP may be performed by at least two peripheral clamping elements on one plate and one internal clamping element on another plate. For example, two peripheral pads 122 of the input plate located on or near two ends of a diameter of the MCP in combination with one internal pad 164 of the output plate located on or near an internal point of that diameter, may maintain flatness or substantially prevent deviation of flatness of the MCP in a direction toward the output plate. Similarly, two peripheral pads 162 of the output plate located on or near two ends of a diameter of the MCP in combination with one internal pad 124 of the input plate located on or near an internal point of that diameter may maintain flatness or substantially prevent deviation of the flatness of the MCP in a direction toward the input plate.

In some embodiments, one or more sets of the pads on the input plate or the output plate may be replaced with other types of clamping elements, which may have a variety of shapes such as circular rings, rectangular rings, elongated pads, etc. Some of these other types may be considered as clamping elements that can contact the MCP in multiple contact points and may therefore help maintain or improve the flatness of the MCP in a manner similar to those provided by multiple pads discussed above. In some of these embodiments therefore, the above discussions about mechanisms of maintaining or increasing flatness with different configurations of the pads may be applied to these other forms of clamping elements.

Next, another set of features are described that improve the functionality of the assembly in another aspect, which is, reducing erosion of the MCP assembly due to electric discharge. By way of example, such erosion may occur due to an electric discharge induced in gas trapped in one or more microchannels of the MCP via the electric field. In other words, during the operation of the mass spectrometer when the ion detector is exposed to high electric fields, the trapped gas may undergo electric discharge, which may potentially damage parts that are exposed to that discharge.

One of the reasons for the above mentioned trapping of gas in some of the microchannels may be that the microchannel is blocked at both ends, that is, at its entrance by an input plate clamping element and at its exit by an output plate clamping element. To avoid such trapping, in some embodiments the input plate clamping elements and the output plate clamping elements are staggered such that if one of the two openings (entrance or exit) of a microchannel is blocked by one of the clamping elements on one side, the other opening remains unblocked.

Figure 3D:
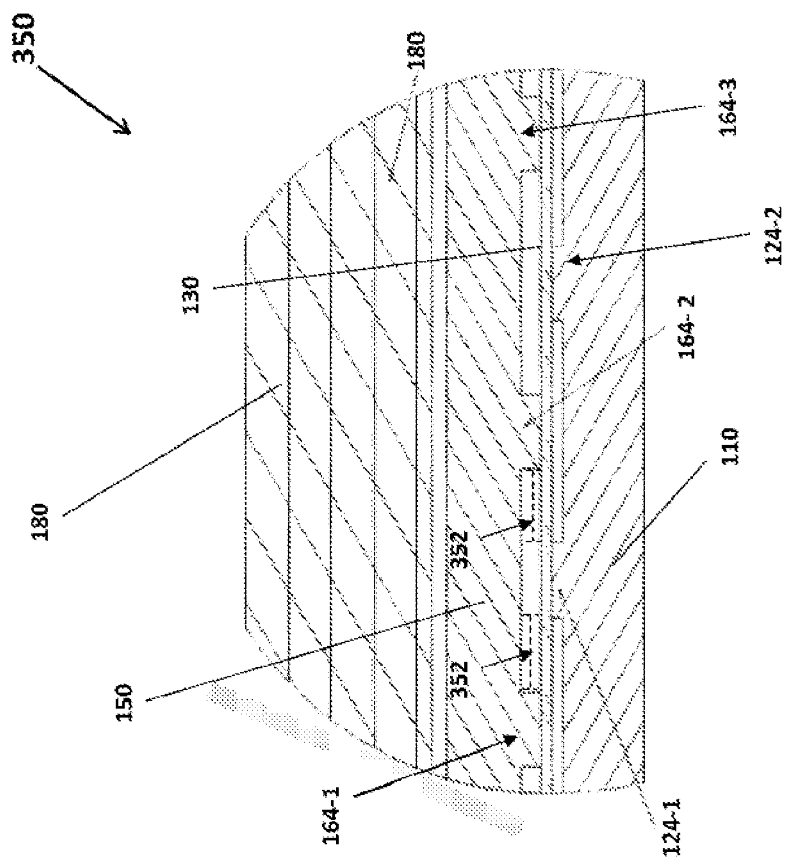
FIGS. 3C and 3D respectively show detail views 350 and 360 marked in FIGS. 3A and 3B.

FIG. 3D displays one example of this staggering according to the embodiment shown here. FIG. 3D shows two internal input plate pads 124-1 and 124-2 in contact with MCP 130 on its input face. Further, FIG. 3D shows 3 internal output plate pads 164-1, 164-2, and 164-3 in contact with MCP 130 on its output face. As seen, the locations of the input plate pads and the output plate pads are laterally staggered relative to one another, such that there is no overlap or very little overlap between the areas of the input face of the MCP covered by the input plate pads and the areas of the outward face of the MCP covered by the output plate pads. Same type of staggering may be applied to the design of the peripheral pads of the two plates. In other words, the input and output plate pads are distributed such that no microchannel is blocked simultaneously at both ends via an input plate pad and an output plate pad.

FIG. 3E shows a configuration 370 of clamping elements according to some embodiments. Configuration 370 may, for example, correspond to the input plate pads and output plate pads of assembly 100 discussed above. In configuration 370, the input plate pads and the output plate pads have all been projected into one plane parallel to the input plate and the output plate and shown on that plane. Moreover, the input plate pads are shown as being smaller than the output plate pads for distinction. In various embodiments, the input plate pads may be smaller, of the same size, or larger than the output plate pads.

Configuration 370 includes a plurality of peripheral input plate pads 372-1, which may be located in the periphery of the input plate as explained before. Moreover, configuration 370 includes a plurality of peripheral output plate pads 372-2, which may be located in the periphery of the output plate as also explained before. These two sets of pads are staggered with respect to each other, such that in the projection shown in configuration 370, each peripheral input plate pad 372-1 is located between two peripheral output plate pads 372-2, and vice versa.

Configuration 370 further includes a plurality of internal input plate pads 374-1, which may be located along the periphery of a rectangularly shaped input window, such as input window 114 discussed above. Moreover, configuration 370 includes a plurality of internal output plate pads 374-2, which may be located along the periphery of a rectangularly shaped output window, such as output window 154 discussed above. These two sets of pads are also staggered with respect to each other, such that in the projection shown in configuration 370, each internal input plate pad 374-1 is located between two internal output plate pads 374-2, and vice versa.

Peripheral pads 372-1 and 372-2 may provide support or electrical connection for the periphery of the MCP and further help maintain or improve the flatness of the MCP in its periphery in the manner, for example, explained above. Moreover, staggering these pads on the two plates may reduce erosion of the MCP by minimizing trapping of gas in the microchannels.

Similarly, internal pads 374-1 and 374-2 may provide support or electrical connection for internal parts of the MCP, for example around the input window or the output window. Moreover, in combination with peripheral pads 372-1 and 372-2, internal pads 374-1 and 374-2 may help maintain or improve the flatness of the MCP at its internal points in the manner, for example, explained above. Moreover, staggering these pads on the two plates may reduce erosion of the MCP by minimizing trapping of gas in the microchannels.

Some embodiments avoid exertion of high stress on the MCP by designing the staggering among the pads such that a distance 352 between consecutive pads on the two sides of the MCP exceeds a minimum pad distance. Such stress may result from a so-called "scissors effect" generated by a pair of such consecutive pads such as internal output plate pad 164-1 and internal input plate pad 124-1. For example, pad 164-1 may exert a first force on the output face of MCP 130 toward the input plate (downward in FIG. 3D). Pad 124-1, on the other hand, may exert a second force in the opposite direction on the input face of MCP 130, that is, toward the output plate (upward in FIG. 3D). These forces may result from manufacturing fluctuations in the heights of the pads, which may cause the input plate pad to protrude into the input face of the MCP or the output plate pad to protrude into the output face of the MCP. If distance 352 is less than the minimum pad distance (i.e., the lateral distance between an upper and an adjacent lower pad), the resulting stress may damage the MCP by, for example, breaking or cracking the MCP. The minimum pad distance may be determined based on one or more factors such as, average or maximum fluctuation in the heights of the pads, and the maximum angle to which the MCP may be bent at a point before being damaged. In some embodiments, the minimum path distance may be determined by equating the tangent of that maximum angle to the ratio of the total protrusion (the protrusions on each side) divided by the minimum path distance. In some embodiments, the minimum pad distance may be a distance between 1-2 millimeters.

In some embodiments, to implement the above discussed staggering of the pads, mechanisms are employed to assure that the input plate and the output plate are placed in the MCP holder in predetermined positions with respect to each other and are maintained in those position, e.g., by preventing them from sliding away from those predetermined positions. In some embodiments, such as assembly 100, such a mechanism may be provided by using pins 125. That is, pin holes 126 in the input plate and pin holes 166 in the output plate are positioned such that, when they are in substantial alignment and fixed with respect to each other using pins 125, the corresponding parts of the input plate and the output plate are positioned in their predetermined locations with respect to each other. Those corresponding parts include the peripheral pads of the input plate with respect to the peripheral pads of the output plate, the internal pads of the input plate with respect to the internal pads of the output plate, or the input window with respect to the output window. Pins 125, moreover, fix MCP 130 in its location and prevent it from sliding out of the area predetermined by the MCP areas of the input plate and the output plate.

Next, another set of features are described that may improve the functionality of the assembly in another aspect, which is, increasing tolerance of the MCP assembly against temperature changes or external stress. Temperature changes when combined with differences in coefficients of expansion among different parts of the assembly may generate stress. For example, screws 111 may contract or expand by a different amount as compared to the parts to which they are attached, which are the input plate and the supporting plate or as compared with the parts that are inserted between the supporting plate and the input plate, which are the MCP and the output plate. To accommodate for these differences, some embodiments may provide floating gaps or biasing elements, as further described below.

Figure 3C:
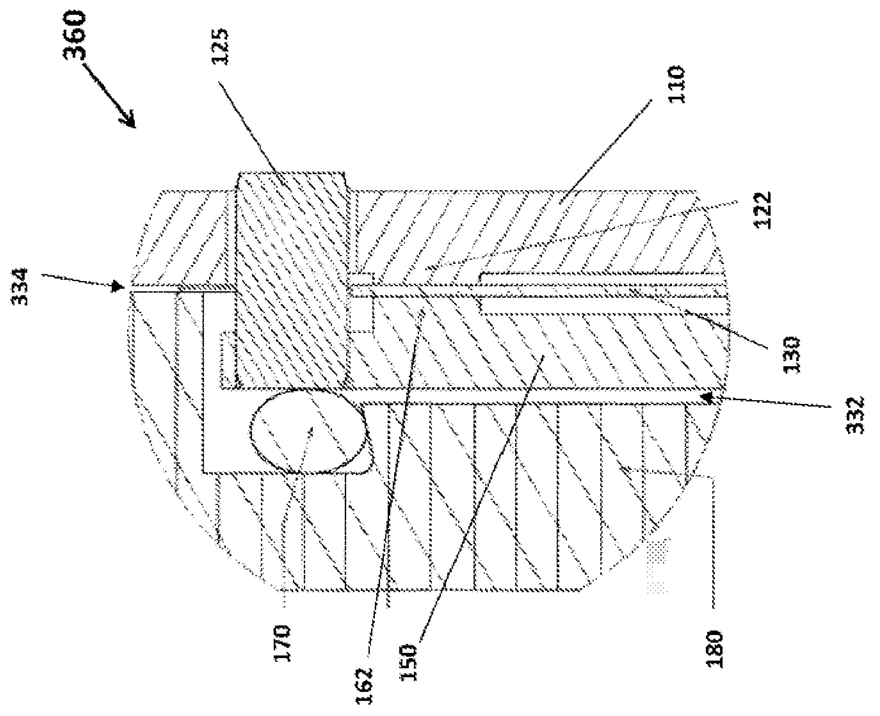
Figure 3E:
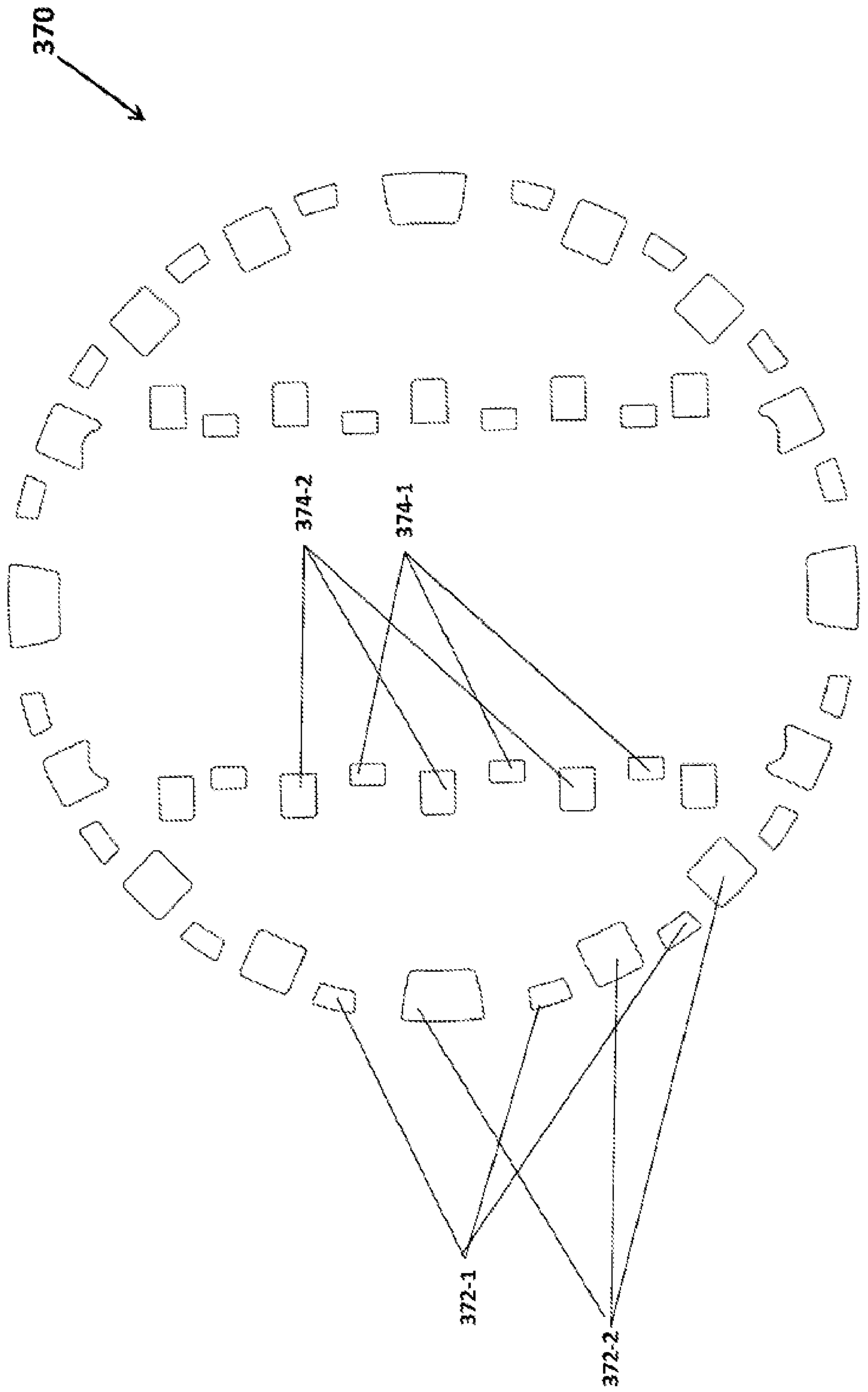
FIG. 3E shows a configuration of clamping elements according to some embodiments.

Assembly 100, for example, includes a biasing element in the form of spring 170. In this case, spring 170 may be a ring shaped coil spring made of plated steel, stainless steel or beryllium-copper alloy. Moreover, as shown in FIG. 3C, assembly 100 includes a floating gap 332 between output plate 150 and supporting plate 180, and another floating gap 334 between input plate 110 and supporting plate 180. Floating gap 332 allows for slight movements of the output plate with respect to the supporting plate to release stress in the parts, while spring 170 maintains the clamping effect of the output plate with respect to the input plate against the MCP. Floating gap 334, on the other hand, allows for slight movements of the input plate with respect to the supporting plate to release stresses that may result from, for example, contraction or expansion of screws 111. In different embodiments floating gaps 332 may have a width of (0.3 mm) to 3 mm, floating gap 334 may have a width of (0.3 mm) to 3 mm, and spring 170 may have a spring clamping force of about 0.5N to 30N.

Figure 5C:
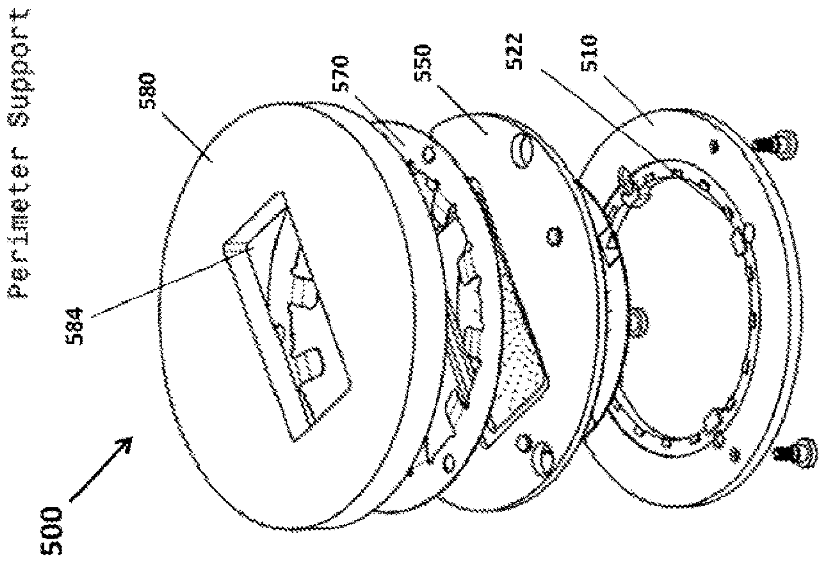
FIGS. 5A-5C show an MCP assembly 500 having a first alternative configuration compared to assembly 100 according to some embodiments.
Figure 5B:
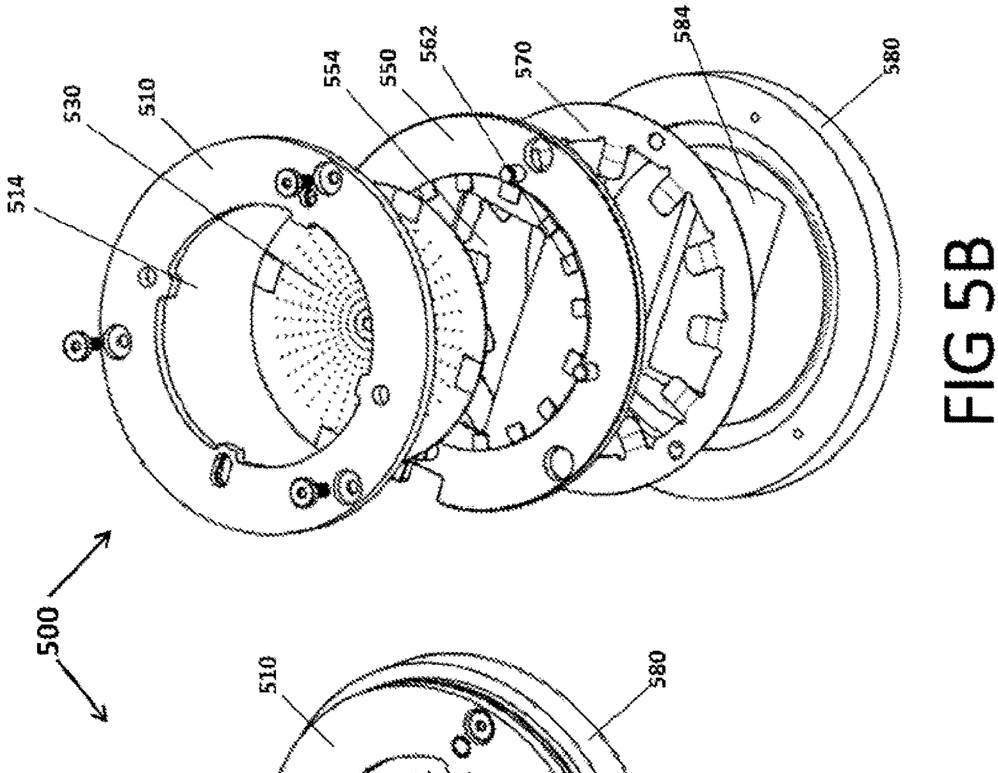
Figure 5A:
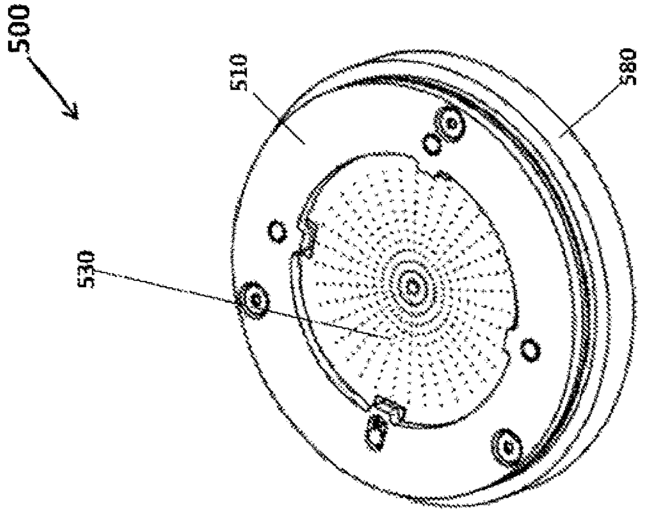

Various embodiments may utilize different configurations for holding or clamping the MCP. FIGS. 5A-5D show an MCP assembly 500 having a first alternative configuration compared to assembly 100 according to some embodiments. More specifically, FIG. 5A shows an isometric view of assembly 500 when assembled, while FIG. 5B shows an exploded isometric view of assembly 500. Assembly 500 includes an input plate 510, an MCP 530, an output plate 550, a biasing element 570, and a supporting plate 580. Input plate 510 includes an input window 514 that is circular. Output plate 550, on the other hand, includes an output window 554 that is rectangular and covers an area that is part of, and smaller than, the area covered by input window 514. Supporting plate 580, on the other hand, also has a rectangular output window 584, for which the area overlaps the area of output window 554 of output plate 550. Input plate 510 and output plate 550, include peripheral clamping elements in the form of input plate peripheral pads 522 and output plate peripheral pads 562, respectively. These pads together may function to maintain or improve flatness of the MCP in its periphery in the manner discussed above for peripheral pads of assembly 100. Moreover, input plate peripheral pads 522 and output plate peripheral pads 562 may be staggered with respect to each other to minimize trapping of gas in the microchannels as discussed above for assembly 100. These features are further described in relation to FIG. 5D.

Figure 5D:
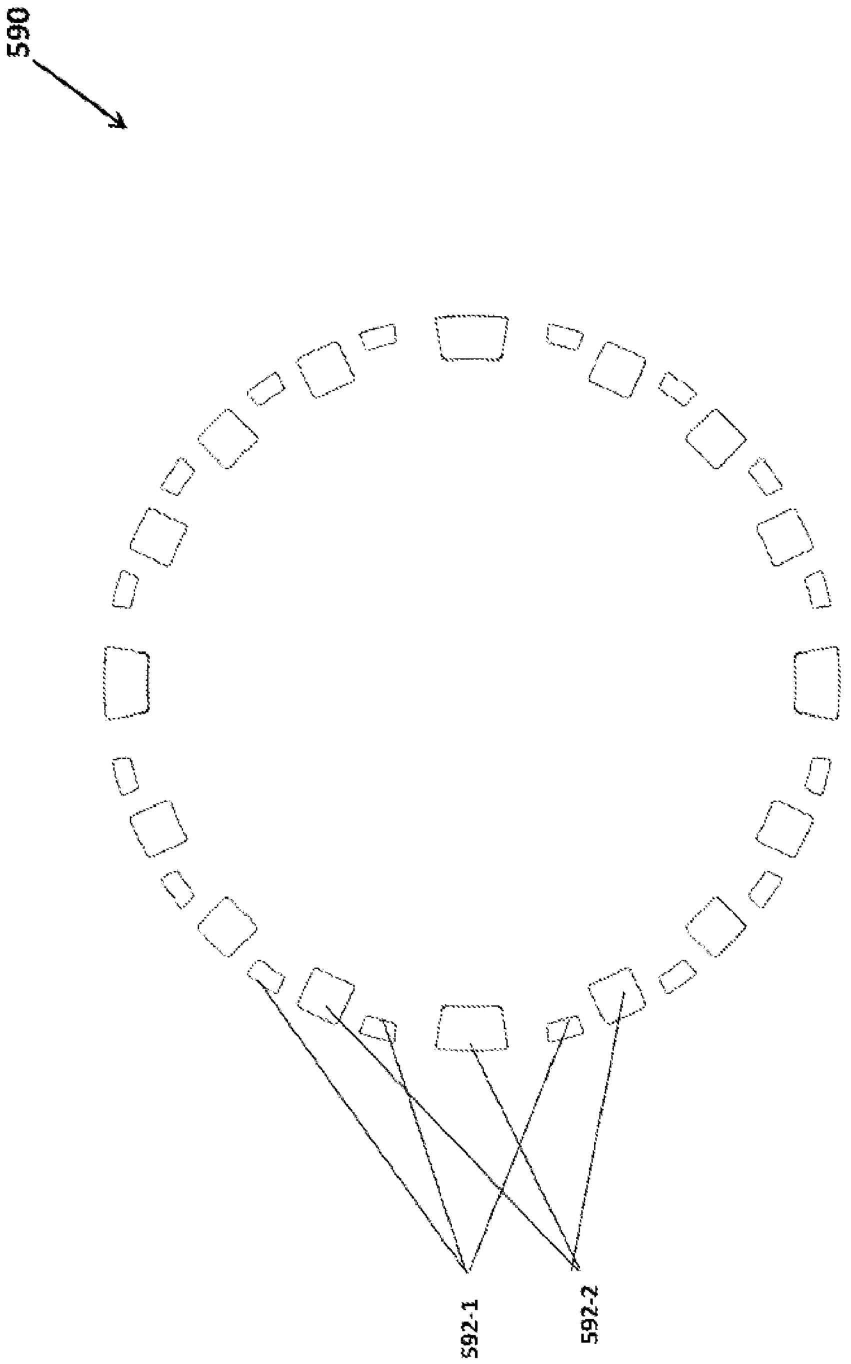
FIG. 5D shows a configuration 590 of clamping elements according to some embodiments.

FIG. 5D shows a configuration 590 of clamping elements according to some embodiments. Configuration 590 may, for example, correspond to the input plate pads and output plate pads of assembly 500. Configuration 590 includes a plurality of peripheral input plate pads 592-1 and a plurality of peripheral output plate pads 592-2, all of which are located in the periphery of configuration 590. These two sets of peripheral pads may be staggered with respect to each other in the manner discussed above for the two sets of peripheral pads 372-1 and 372-2.

Peripheral pads 592-1 and 592-2 may provide support or electrical connection for the periphery of the MCP, and further help maintain or improve the flatness of the MCP in its periphery in the manner, for example, explained above. Moreover, staggering these pads on the two plates may reduce erosion of the MCP by minimizing trapping of gas in the microchannels.

Figure 6C:
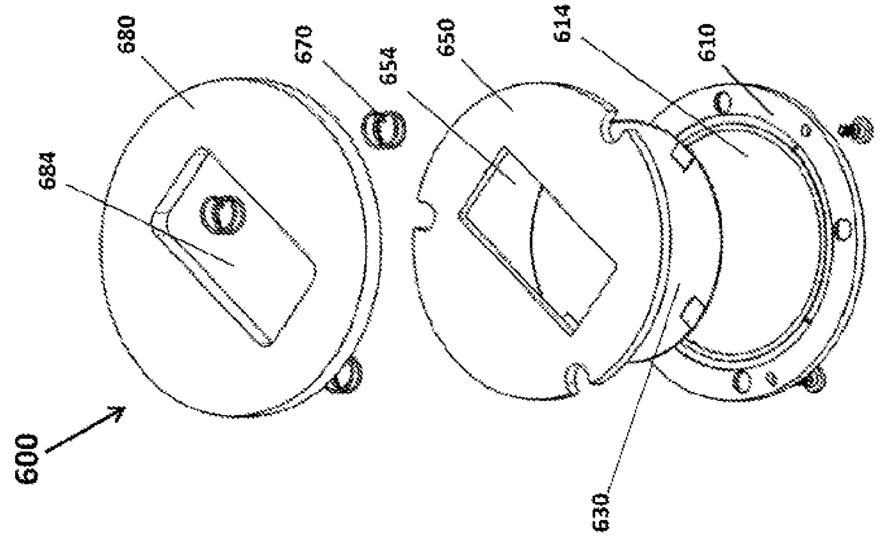
FIGS. 6A-6C show yet another MCP assembly 600 having a second alternative configuration compared to assembly 100 according to some embodiments.
Figure 6B:
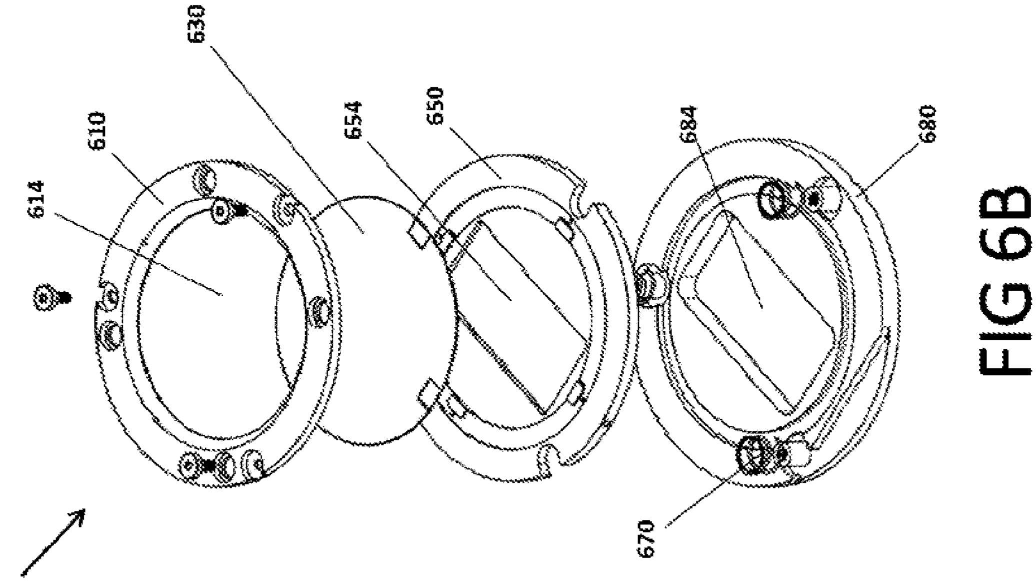
Figure 6A:
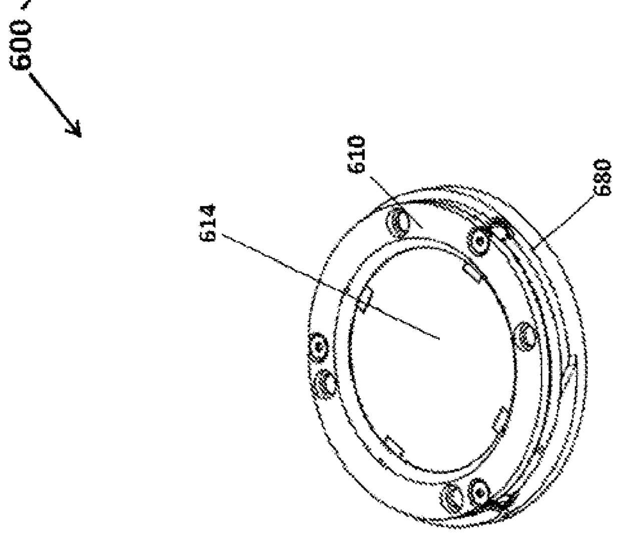

FIGS. 6A-6C show yet another MCP assembly 600 having a second alternative configuration compared to assembly 100 according to some embodiments. More specifically, FIG. 6A shows an isometric view of assembly 600 when assembled, while FIG. 6B shows an exploded isometric view of assembly 600. Assembly 600 includes an input plate 610, an MCP 630, an output plate 650, three biasing elements 670, and a supporting plate 680. Input plate 610 includes an input window 614 that is circular. Output plate 650, on the other hand, includes an output window 654 that is rectangular and covers an area that is part of, and smaller than, the area covered by input window 614. Supporting plate 680, on the other hand, also has a rectangular output window 684, for which the area overlaps the area of output window 654 of output plate 650. The area of output windows 654 may be smaller than the area of input windows 614. More specifically, the rectangularly shaped projection of output window 654 on MCP 630 may be embedded inside the circularly shaped projection of input window 614 on the MCP. Moreover, the active area of MCP 630 may be a portion of that rectangularly shaped projection of the output window.

Assembly 600 provides an embodiment in which the biasing elements are in the form of three coil springs 670. When assembled, these coil springs may be compressed between the supporting plate and the output plate in its longitudinal direction. In a manner similar to the function of spring 170 in assembly 100, here coil springs 670 maintain the clamping effect of the output plate with respect to input plate against the MCP, while allowing slight movements by the output plate with respect to the supporting plate to release stress in the parts.

The above detailed description refers to the accompanying drawings. The same or similar reference numbers may have been used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

The foregoing description of the embodiments has been presented for purposes of illustration only. It is not exhaustive and does not limit the embodiments to the precise form disclosed. While several exemplary embodiments and features are described, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. As used herein, the singular forms "a," "an," and "the" may include the plural forms unless the context clearly dictates otherwise. Further, the term "coupled" does not exclude the presence of intermediate elements between the coupled items. Also, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Similarly, if used herein, the term "and/or" includes any and all combinations of one or more of the associated listed items and may be abbreviated as "/".

Moreover, if these terms are used, a subset of a set may include one or more than one, including all, members of the set.

Further, if used in this disclosure, and unless stated or deducted otherwise, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiments, a first variable may be an increasing or a decreasing function of a second variable if, respectively, the first variable is directly or inversely proportional to the second variable.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Further, as used herein, the terms "about" and, "substantially, and "substantially equal" refer to variations in a numerical quantity and/or a complete state or condition that may occur, for example, through measuring or handling procedures in the real world; through inadvertent error in these procedures; through differences in the manufacture, source, or purity of compositions or reagents; and the like. Typically, the terms "about" and "substantially" as used herein means 10% greater or lesser than the value or range of values stated or the complete condition or state. For instance, a concentration value of about 30% or substantially equal to 30% may mean a concentration between 27% and 33%. The terms also refer to variations that would be recognized by one skilled in the art as being equivalent so long as such variations do not encompass known values practiced by the prior art.

Modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents. Further, the present disclosure is directed toward all novel and non-obvious features and aspects of the various disclosed embodiments, alone and in various combinations and sub-combinations with one another.

Although some aspects have been described in the context of a system and/or an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention may be implemented in hardware and/or in software. The implementation may be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Those having ordinary skill will appreciate that various changes may be made to the above embodiments without departing from the scope of the invention.

While the present disclosure has been particularly described in conjunction with specific embodiments, many alternatives, modifications, and variations will be apparent in light of the foregoing description. It is therefore contemplated that the appended claims will embrace any such alternatives, modifications, and variations as falling within the true spirit and scope of the present disclosure.

What is claimed is:

1. A mount assembly for holding a microchannel plate in an ion detector, the mount assembly comprising:

an input side clamping plate including a plurality of input side pads and defining an input side aperture; and an output side clamping plate including a plurality of output side pads, wherein, when assembled, the input side clamping plate and the output side clamping plate are configured to:

allow positioning between the input side clamping plate and the output side clamping plate, the microchannel plate having a plurality of microchannels each having an input side opening and an opposed output side opening;

define at least an exposed area and a covered area on the microchannel plate, the exposed area being circumscribed by the input side aperture, and the covered area being outside the exposed area and having an input side face facing the input side clamping plate and an output side face facing the output side clamping plate;

allow a plurality of ions to pass through the input side aperture and reach a subset of the microchannels located in the exposed area of the microchannel plate;

hold the microchannel plate by providing contact between a portion of the input side face of the covered area and a subset of the input side pads, and further between a portion of the output side face of the covered area and a subset of the output side pads; and position the subset of the input side pads and the subset of the output side pads in a staggered configuration such that when a microchannel of a plurality of microchannels located in the covered area is obstructed in a first opening, the first opening being an input side opening of the microchannel obstructed by an input side pad of the subset of the input side pads or an output side opening of the microchannel obstructed by an output side pad of the subset of the output side pads, a second opening of the microchannel opposing the first opening is unobstructed.

2. The mount assembly of claim 1, wherein, when assembled and holding the microchannel plate, the input side clamping plate and the output side clamping plate are further configured to maintain or increase flatness of the microchannel plate.

3. The mount assembly of claim 1, further comprising a supporting plate configured for mechanical engagement with the output side clamping plate.

4. The mount assembly of claim 3, further comprising a biasing element configured for:

being positioned between the supporting plate and the output side clamping plate; and allowing the output side clamping plate to float with respect to the input side clamping plate.

5. The mount assembly of claim 4, wherein the biasing element is a spring.

6. The mount assembly of claim 3, further comprising two openings disposed in the input side clamping plate and the output side clamping plate configured for receiving a fastener for mechanically engaging the supporting plate to the input side clamping plate.

7. The mount assembly of claim 1, further comprising a plurality of pins protruding from the input side clamping plate and configured to:

engage with corresponding openings in the output side clamping plate; and align the input side clamping plate with the output side clamping plate.

8. The mount assembly of claim 7, wherein the plurality of pins are further configured to define a location of the microchannel plate between the input side clamping plate and the output side clamping plate.

9. The mount assembly of claim 1, wherein the staggered configuration provides, for the microchannel of the plurality of microchannels located in the covered area, an exhaust through the second opening.

10. The mount assembly of claim 1, further comprising electrical connections configured to create an electrical potential difference between the input side clamping plate and the output side clamping plate.

11. The mount assembly of claim 1, wherein in the staggered configuration a distance between a first input side pad in contact with the input side face of the covered area and a second output side pad in contact with the output side face of the covered area is greater than a threshold distance to avoid subjecting the microchannel plate to high stress resulting from scissors effect.

12. The mount assembly of claim 1, wherein the output side clamping plate further defines an output side aperture.

13. The mount assembly of claim 1, further comprising a supporting plate configured for mechanical engagement with the input side clamping plate.

14. The mount assembly of claim 13, further comprising a biasing element configured for:

being positioned between the supporting plate and the input side clamping plate; and allowing the input side clamping plate to float with respect to the output side clamping plate.

15. A mount assembly for holding a microchannel plate in an ion detector, the mount assembly comprising:

an input side clamping plate including a plurality of input side pads and defining an input side aperture; and an output side clamping plate including a plurality of output side pads and separated from said input side clamping plate to provide a gap in which said microchannel plate is positioned, wherein the microchannel plate includes a plurality of microchannels each having two opposed openings, wherein said input side and output side clamping plates are positioned relative to one another such that a first subset of said microchannels can receive ions via said input side aperture and a second subset of said microchannels are inaccessible to the ions passing through said input side aperture, and wherein at least a portion of said input side pads are distributed relative to at least a portion of the output side pads in a staggered configuration such that when an opening of an ion-inaccessible microchannel is obstructed by one of said input or output pads, an opposed opening the ion-inaccessible microchannel remains unobstructed.

16. The mount assembly of claim 15, further comprising a plurality of contacts positioned between said input side clamping plate and said output side clamping plate for fixedly holding said input side and said output side clamping plates relative to one another.

* * * * *